33-268. OR AI 247 SR

DRAFTSMAN

F. Yeiser.

Altitude Instrument.

A.I.
No. 247.

A.I. Patented Aug. 9, 1859.

Fig. 2.

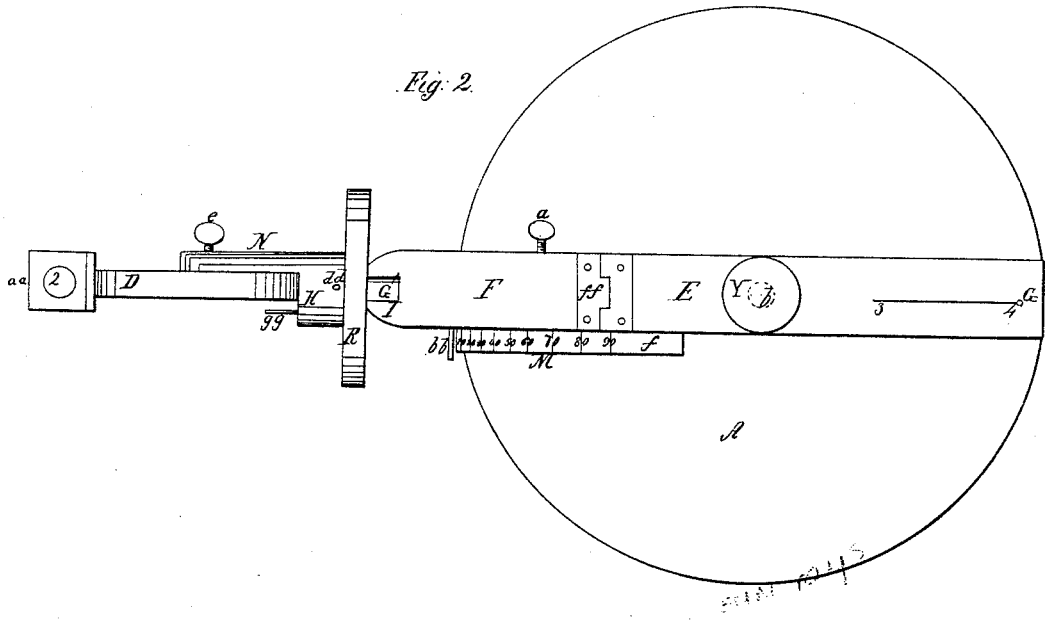

Fig. 1.

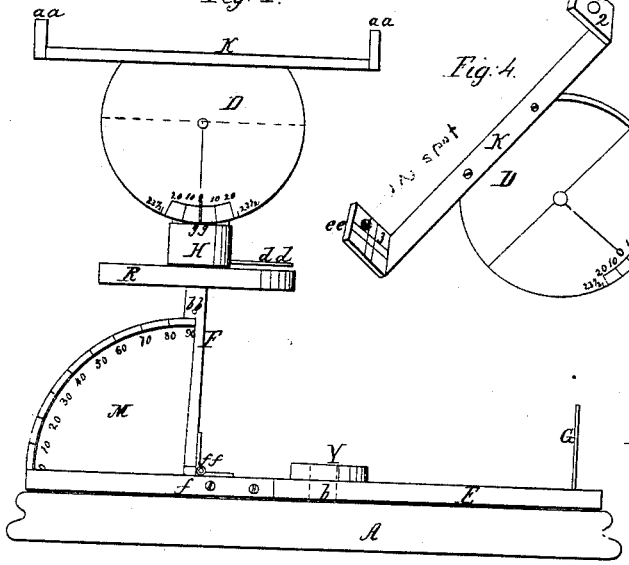

Fig. 4.

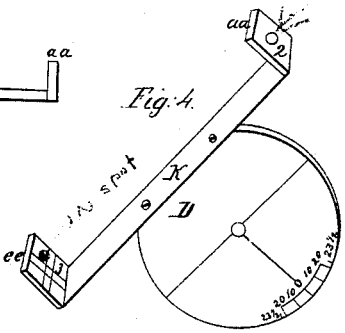

Fig. 5.

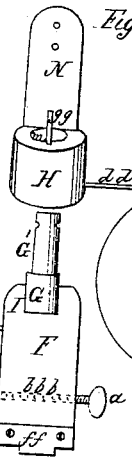

Fig. 3

Fig. 6.

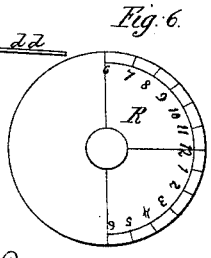

1464
X 1449

Witnesses,

Inventor,

Frederick Yeiser

[redacted] original Letters Patent No. 22,913.—*Improved Instrument for taking Altitudes of* [redacted] combination with the rotary bar E, the arrangement of the adjustable [redacted] and rotary cylinder H, and adjustable [redacted] D, in connection with the [redacted] and plates [redacted] holding the lens, and *e e* having on its face a small square 3 to receive [redacted]n's image through the lens, in such relation to each other, and to the rotary bar E that [redacted]afes substantially as and for the purposes specified.

FREDERICK YEISER.